(No Model.)
J. B. ODELL.
STREET RAILWAY CAR TRUCK.
No. 431,072. Patented July 1, 1890.
Fig. 1.
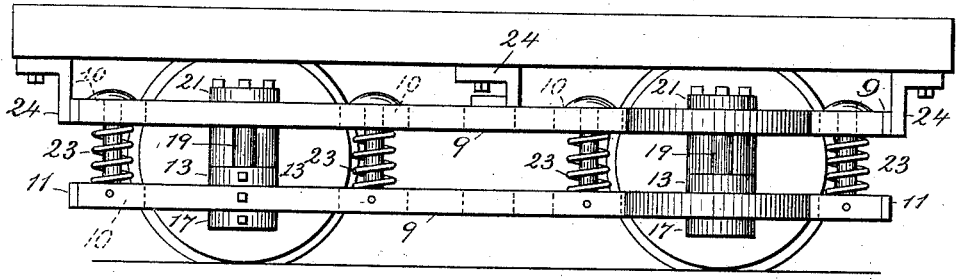
Fig. 2.
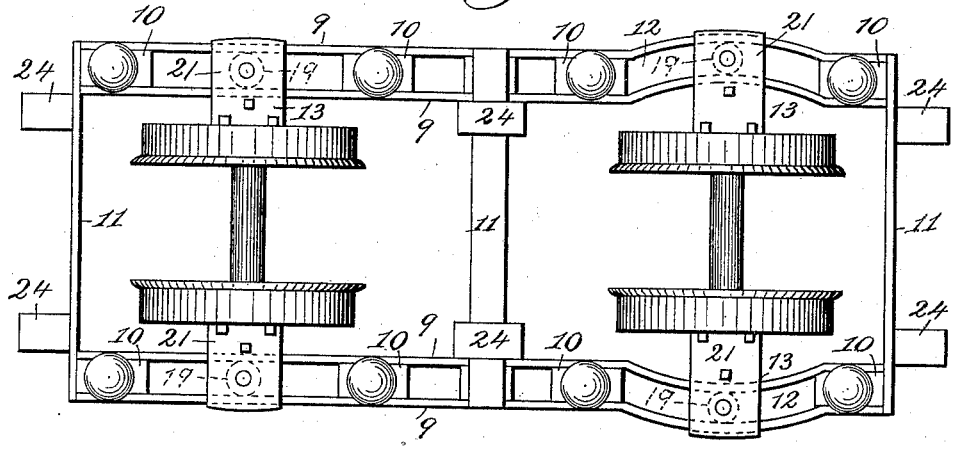
Fig. 3.  Fig. 4.  Fig. 5.
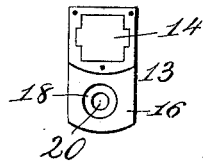 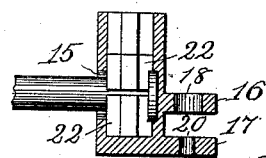 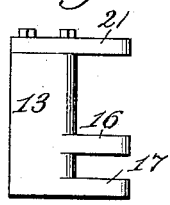
Fig. 6.  Fig. 7.
 
Witnesses:
Francis P. Loring
Jas. H. Hart
Inventor:
John B. Odell

UNITED STATES PATENT OFFICE.

JOHN B. ODELL, OF CHICAGO, ILLINOIS.

STREET-RAILWAY CAR-TRUCK.

SPECIFICATION forming part of Letters Patent No. 431,072, dated July 1, 1890.

Application filed March 26, 1890. Serial No. 345,461. (No model.)

*To all whom it may concern:*

Be it known that I, JOHN B. ODELL, a citizen of the United States, residing at Chicago, in the county of Cook and State of Illinois, have invented certain new and useful Improvements in Street-Railway Car-Trucks, of which the following is a full description, reference being had to the accompanying drawings, and to figures of reference marked thereon, which form part of this specification.

The object of my invention is to provide a simple and cheap car-truck capable of rounding sharp curves with the least possible friction, and especially adapted for electric-motor cars, as in such cars the friction at curves greatly reduces the speed of the armature, and therefore greater power must be provided than otherwise would be necessary were this friction reduced to a minimum; and, further, I provide for the easy removal of the car-body, reducing the expense in changing from winter to summer cars, or vice versa.

To this end my improvements consist in journaling each end of the axle in movable boxes, the boxes being held in curved guides and movable laterally therein in an arc of a circle of which the center of the tread of the wheel farthest from it is the radius, the car-body being bolted to the angle-plates fastened to the upper portion of the frame-work and free to move upward and downward upon springs rigidly held by the lower portion of the frame-work.

Figure 1 is a side elevation of the truck. Fig. 2 is a top plan view. Fig. 3 is a top view of one of the boxes with the top plate removed. Fig. 4 is a longitudinal section of one of the boxes, showing the axle in its bearings; Fig. 5, a side view of one of the boxes; Fig. 6, an end view of one of the journal-boxes; Fig. 7, a detail view of the friction-roller.

Similar figures refer to similar parts throughout the several views.

I prefer to make each side of the truck-frame of steel straps 9, separated by iron blocks 10 and firmly riveted together, the sides connected by cross-strips 11. At the forward end of the truck the straps 9 are bent outward in a circle whose radius is taken from the center of the tread of the wheel farthest from it, forming guideways 12, Fig. 2, wherein the boxes 13 move laterally. The boxes 13 are made with a square opening at the top, Fig. 3, and a round opening 15 at the rear end, Fig. 4. This opening is made large enough to admit the end of the axle. The front wall of the box is recessed to allow the axle to turn freely when the journal-boxes are in position. The journal-boxes bearing against the rear wall of the box above and below the opening prevent the axle from pulling out of the box.

The front face of the box is made rounding to more freely move in the guideways. Two projections 16 and 17, Figs. 4 and 5, are cast on the box, having space enough between them to admit of the lower straps 9 to rest between them, preventing these straps from moving up or down. The projection 16 has a hole 18, Figs. 3 and 4, large enough to allow the friction-roller 19 to pass freely through it and journal into the hole 20 in the lower projection 17. The top plate 21 is provided with a hole to receive the other end of roller 19.

To place the boxes in position, the lower half of the journal-box 22, Fig. 4, is inserted in the bottom of the box, the axle passed through the opening in the back and rested on the lower box 22, the upper half of the journal-box 22 is put in from the top, and the space between this box and the top may be filled with rubber to act as a spring, or with iron blocks or any material that will fill up the space and hold the axle in position. The boxes being in position on the axle, the lower straps 9 are placed between the projections 16 and 17, the upper straps 9 resting against the face of the box. The friction-roller 19 is inserted between the upper and lower guideways and is of just the diameter of the guideways. The top plate 21 is then bolted on the box. The friction-roller 19 enters the hole in this plate and is free to turn when forced against the sides of the guideways. It will be seen by this construction that the axle is free to turn in the box and the box free to move laterally in the guideways, thus following the curves of the track either to the right or left. In the arrangements of trucks shown the hind axle is held rigidly at right angles to the truck-frame, it not being desired to move them. The boxes, however, are made the same as the forward boxes, with the exception of their faces being square. The lower straps 9 of the frame are made straight and firmly fastened with the friction-roller 19 to the front face of the boxes, preventing any movement thereof. The friction-roller 19 passes freely through the upper straps 9, and the top plate 21 holds it in position, as in the forward box. It, being held rigid at the bottom, does not act as a friction-roller, but simply as a guide to the upper part of the frame carrying the car-body. A sufficient number of springs 23 are provided for sustaining the upper portion of the frame carrying the car-body, they being held in position by headed pins passing freely through holes in blocks 10 and bolted to the lower frame 9. The heads of the pins serve to prevent the car-body rising above a fixed point. When the springs are depressed, the upper frame is guided on the pins and the friction-rollers 19, giving an easy motion to the car.

To change the truck from one car to another, it is simply unbolted from the angle-plates 24. While I have shown the guideways formed by bending the straps of the frame, it is clear that they may be cast and then fastened to the frame, if so desired.

Having described my invention, what I claim as new, and desire to secure by Letters Patent, is—

1. In a car-truck, the combination of an axle having both ends journaled in boxes movable laterally in an arc formed by the frame-work of the truck, substantially as described.

2. In a car-truck, the combination of an axle having its ends journaled in boxes movable in a circular guideway upon the framework, the radius of which is taken from the center of the tread of the wheel farthest from it, substantially as described.

3. In a car-truck, the combination of a frame supporting the car-body and resting upon springs guided by pins in its upward and downward motion, one end of said pins being rigidly held by a second frame, said second frame being rigidly held from upward or downward motion by boxes sustained by the axles, both frames having circular guideways at one or both ends, and a friction-roller passing through said guideways and sustained by the said boxes in a manner to permit the free movement of the boxes in the guideways, substantially as described.

4. The journal-box 13, having projections 17 and 17, and top plate 21, sustaining the frictional roller 19, substantially as shown, for the purpose specified.

JOHN B. ODELL.

Witnesses:
F. P. LORING,
H. N. LEE.